US012733729B2

(12) United States Patent
Omotezako

(10) Patent No.: US 12,733,729 B2
(45) Date of Patent: Sep. 15, 2026

(54) METHOD AND SYSTEM FOR DETERMINING COSMETIC SKIN ATTRIBUTES BASED ON DISORDER VALUE

(71) Applicant: The Procter & Gamble Company, Cincinnati, OH (US)

(72) Inventor: Tatsuya Omotezako, Singapore (SG)

(73) Assignee: The Procter & Gamble Company, Cincinnati, OH (US)

( * ) Notice: Subject to any disclaimer, the term of this patent is extended or adjusted under 35 U.S.C. 154(b) by 224 days.

(21) Appl. No.: 18/679,578

(22) Filed: May 31, 2024

(65) Prior Publication Data

US 2024/0398097 A1 Dec. 5, 2024

Related U.S. Application Data

(60) Provisional application No. 63/469,834, filed on May 31, 2023.

(51) Int. Cl.
*G06T 7/90* (2017.01)
*A45D 44/00* (2006.01)
(Continued)

(52) U.S. Cl.
CPC .............. *A45D 44/005* (2013.01); *G06T 5/70* (2024.01); *G06T 7/90* (2017.01); *G06V 10/25* (2022.01); *G06V 10/56* (2022.01); *G06V 10/70* (2022.01); *G06V 40/10* (2022.01); *A45D 2044/007* (2013.01); *G06T 2207/10024* (2013.01);
(Continued)

(58) Field of Classification Search
CPC ... G06T 5/70; G06T 7/90; G06T 2207/10024; G06T 2207/20081; G06T 2207/30201; G06V 10/25; G06V 10/56; G06V 10/70; G06V 40/10; G06V 40/16; A45D 44/005; A45D 2044/007; A61B 5/441
See application file for complete search history.

(56) References Cited

U.S. PATENT DOCUMENTS 9,687,155 B2 6/2017 Aarabi
2015/0230712 A1 8/2015 Aarabi
(Continued)

FOREIGN PATENT DOCUMENTS

KR 20220078231 A * 6/2022 ............. A61B 5/442
KR 102458615 B1 10/2022

OTHER PUBLICATIONS

All Office Actions; U.S. Appl. No. 18/679,576, filed May 31, 2024.
(Continued)

*Primary Examiner* — Tracy Mangialaschi
(74) *Attorney, Agent, or Firm* — Alexandra S. Anoff

(57) ABSTRACT

A method and system for determining cosmetic skin attributes of a person based on disorder value, which shows improved match to the persons' skin color or skin conditions and/or improved match to the persons' perceptions of their skin color or skin conditions. The method includes the steps of: obtaining at least one color image comprising at least one portion of skin of the person; analyzing the at least one color image to obtain a disorder value of a certain color; and determining the cosmetic skin attribute of the at least one portion of skin of the person based on the disorder value.

11 Claims, 10 Drawing Sheets

(51) Int. Cl.

| | |
|---|---|
| ***G06T 5/70*** | (2024.01) |
| ***G06V 10/25*** | (2022.01) |
| ***G06V 10/56*** | (2022.01) |
| ***G06V 10/70*** | (2022.01) |
| ***G06V 40/10*** | (2022.01) |

(52) U.S. Cl.
CPC ............... *G06T 2207/20081* (2013.01); *G06T 2207/30201* (2013.01)

(56) References Cited

U.S. PATENT DOCUMENTS

| | | | | |
|---|---|---|---|---|
| 2015/0359459 | A1 | 12/2015 | Taylor et al. | |
| 2018/0057212 | A1 | 3/2018 | Bush et al. | |
| 2019/0220738 | A1 | 7/2019 | Flank | |
| 2019/0295728 | A1* | 9/2019 | Jeong | G05B 15/02 |
| 2020/0342213 | A1 | 10/2020 | Dissanayake | |
| 2020/0342594 | A1 | 10/2020 | Dissanayake et al. | |
| 2021/0012493 | A1* | 1/2021 | Jiang | G16H 30/40 |
| 2023/0282366 | A1 | 9/2023 | Jeong | |

OTHER PUBLICATIONS

U.S. Appl. No. 18/679,576, filed May 31, 2024, Tatsuya Omotezako.

Search Report and Written Opinion for PCT/US2024/031802 dated Oct. 9, 2024, 12 pages.

Jing Junfeng et al: "Recent advances on image edge detection: A comprehensive review", vol. 503, XP087130367, dated Jul. 2, 2022, 13 pages.

Rosado Luis et al: "Chapter 12—From Dermoscopy to Mobile Teledermatology" In: "Dermoscopy Image Analysis", CRC Press, Taylor & Francis Group, XP093194074, Sections 12.3.1 and 12.3.2 dated Dec. 31, 2016, 41 pages.

* cited by examiner 10
11
16
112a
112c
112c

10
PC
Camera
18
14
Bar LED
Guide LED
30
LCD Monitor
Touch Panel
112a
Amplifier
Left
Right
112c
112b
Projector

| | SAMPLE 1 | SAMPLE 2 | SAMPLE 3 |
|---|---|---|---|
| Animated photo to emphasize the redness | | | |
| Comparative example | a* mean = 13.5 | a* mean = 13.5 | a* mean = 13.5 |
| Disorder value example 1 | a gradient = 0.22 | a gradient = 0.37 | a gradient = 0.75 (Worst) |
| Disorder value example 2 | Ratio of the longest radius to the shortest radius = 1 | Ratio of the longest radius to the shortest radius = 2.52 | Ratio of the longest radius to the shortest radius = 7.48 (Worst) |
| Disorder value example 3 | Total length of the certain color = 5579 | Total length of the certain color = 5392 | Total length of the certain color = 19762 (Worst) |

START

Displaying a first digital image of at least a portion of a face of a subject — 702

Interposing a second digital image of at least a portion of a face of a subject and a plurality of tiles, each having uniquely assigned single degree of indicium — 704

METHOD AND SYSTEM FOR DETERMINING COSMETIC SKIN ATTRIBUTES BASED ON DISORDER VALUE

TECHNICAL FIELD

The present disclosure relates to a method and system for determining cosmetic skin attributes of a person based on disorder value, which shows improved match to the persons' skin color or skin conditions and/or improved match to the persons' perceptions of their skin color or skin conditions.

BACKGROUND

A variety of skin assessment digital tools have been developed to meet the needs of consumers so as to provide information on their skin attributes.

For example, U.S. Publication Number US2020184642A1 (11100639B2) relates to a method for skin examination, and more particularly to a method for skin examination based on RBX color-space transformation. This US publication discloses a method for detecting skin condition, especially degree of skin redness, more specifically by the intensity of skin redness. This US publication discloses in that: "All individuals did not differ with respect to the average red intensity values. However, as shown in FIG. 5, according to the difference of the average red intensity value minus the average green intensity value, namely the R-G value, the severe rosacea group, the moderate rosacea group, the mild rosacea group, the normal group are ranked from high to low".

Another example could be PCT application publication No. WO2019144247A1, relating to systems and methods for facial acne assessment and monitoring, from digital photo images.

One more example could be U.S. Publication Number 2010/0284610A1 ("the '610 Publication") relating to a skin color evaluation method for evaluating skin color from an input image including a face region. The '610 Publication describes dividing a face region of the image into predetermined regions according to first feature points formed of at least 25 areas that are set beforehand and second feature points that are set by using the first feature points. The '610 Publication further describes performing a skin color distribution evaluation by generating a skin color distribution based on average values using at least one of L*, a*, b*, $C_{ab}$*, and $h_{ab}$ of a L*a*b* color system, tri-stimulus values X, Y, Z of an XYZ color system and the values of RGB, hue H, lightness V, chroma C, melanin amount, and hemoglobin amount, followed by performing evaluation based on measured results with respect to the regions that are divided and displaying the measured results or evaluation results on a screen.

However, it has been found by the present inventors that measurement results of persons from such methods may not match to the persons' skin conditions and/or may not match to the persons' perceptions of their skin conditions. Persons who received such measurement result may not be easily accept following skin care product recommendations for improving their skin conditions.

Thus, there remains a need for a method for determining cosmetic skin attributes of a person which shows improved match to the persons' skin conditions and/or improved match to the persons' perceptions of their skin conditions.

SUMMARY OF THE INVENTION

A method of determining a cosmetic skin attribute of a person, the method comprising the steps of:

a) obtaining at least one color image comprising at least one portion of skin of the person;

b) analyzing the at least one color image to obtain a disorder value of a certain color; and c) determining the cosmetic skin attribute of the at least one portion of skin of the person based on the disorder value.

A system for determining a cosmetic skin attribute of a person, the apparatus comprising:

an image obtaining unit for obtaining at least one image comprising at least one portion of skin of the person, wherein preferably said imaging obtaining device comprises a non-transitory computer readable storage medium configured to store the obtained at least one color image;

an image processing unit coupled with said imaging obtaining unit for analyzing the obtained at least one image to obtain a disordered value and determining the cosmetic skin attribute of the at least one portion of skin of the person based on the disordered value, a display generating unit coupled with the image processing unit for generating a display to display content data describing the determined cosmetic skin attribute.

A method and system for determining cosmetic skin attributes of a person based on disorder value, which shows improved match to the persons' skin color or skin conditions and/or improved match to the persons' perceptions of their skin color or skin conditions. The present inventors have surprisingly found that by the use of the disorder value, can provide improved match to the persons' skin color or skin conditions and/or improved match to the persons' perceptions of their skin color or skin conditions, especially improved match to the persons' perception selected from the group consisting of: Stressed Skin, Healthy Skin, Inflaming Skin, Hidden Aging Skin, and mixtures thereof. Especially, the method can provide improved result for early detection of skin imperfection, specifically for early detection of skin aging, i.e., Hidden Aging Skin compared to the known digital tools for skin assessment. Also, the method can provide simple and convenient method to evaluate accumulated stress (Stressed Skin) and inflammatory symptom (Inflaming Skin), through image analysis which has only been measured through biological assay, and Stressed skin and/or Inflaming skin can be a signal of Hidden Aging Skin.

The cosmetic skin attribute may be an imperceivable cosmetic skin attribute, wherein the imperceivable cosmetic skin attributes are, for example, cosmetic skin attributes which are visually imperceivable, cosmetic skin attributes which are difficult to be clearly defined (such as Stressed Skin, Healthy Skin, Hidden Aging Skin), cosmetic skin attributes which are not detectable by an unaided eye, and/or cosmetic skin attributes which are detectable visually by a consumer but the consumer does not understand the cosmetic skin attribute. An advantage of determining imperceivable cosmetic skin attributes is to enable consumers to make informed decisions and take pro-active action to improve the condition of the imperceivable cosmetic skin attributes.

BRIEF DESCRIPTION OF THE DRAWINGS

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate various embodiments described herein, and together with the description serve to explain the principles and operations of the claimed subject matter.

FIG. 6 shows some disorder values obtained for three different skin samples, compared to a conventional color analysis (a* mean);

DETAILED DESCRIPTION

Figure 1:
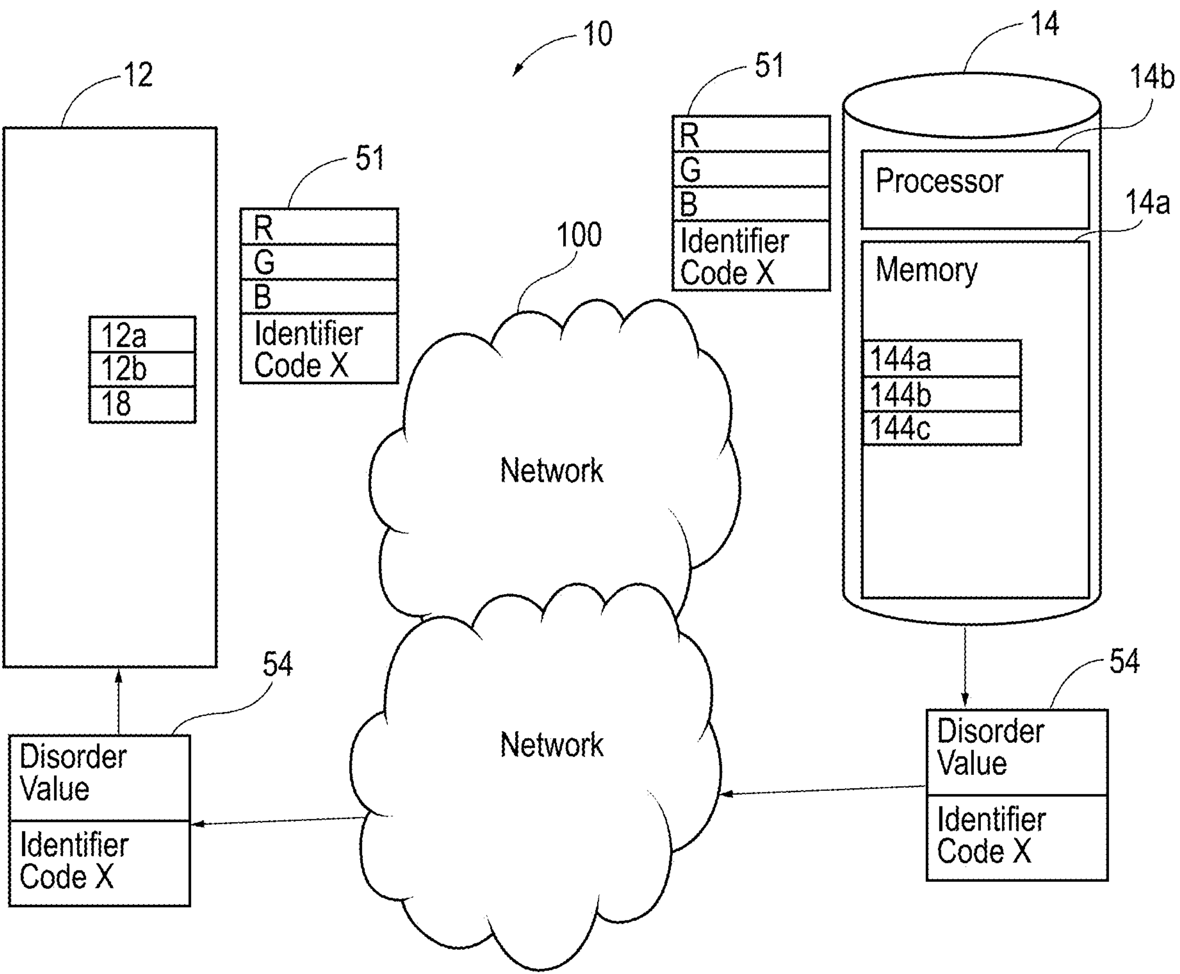
FIG. 1 is a diagram illustrating an exemplary system for determining a cosmetic skin attribute over a network according.

The following terms are defined, and terms not defined should be given their ordinary meaning as understood by a skilled person in the relevant art.

"Cosmetic skin attribute" as used herein includes all skin attributes that provide a visual/aesthetic effect on an area of the human body or impact skin appearance and/or feel. Some non-limiting examples of a cosmetic skin attribute may include skin purity, skin age, skin topography, skin tone, skin pigmentation, skin pores, skin inflammation, skin hydration, skin sebum level, acne, moles, skin radiance, skin shine, skin dullness, uneven tone, or skin barrier. It will be appreciated by a skilled person that the above cosmetic skin attributes are standard terms, and a corresponding definition of the cosmetic skin attribute may be found in the following published references namely. "Handbook of cosmetic science and technology, 3$^{rd}$ edition, editors Andre O. Barel, Marc Paye, Howard I. Maiback, CRC Press, 2009", "Cosmetic Science and Technology-Theoretical Principles and Applications, editors Kazutami Sakamoto Robert Y. Lochhead, Howard I. Maibach, Yuji Yamashita, Elsavier, 2017", "Cosmetic Dermatology: Products and Procedures, Editor (s): Zoe Diana Draelos, Blackwell Publishing Ltd, 2010". Cosmetic skin attributes do not include skin attributes related to medical conditions or underlying medical conditions. Cosmetic skin attribute is preferably selected from the group consisting of: Stressed Skin, Healthy Skin, Inflaming Skin, Hidden Aging Skin, skin age, skin topography, skin tone, skin pigmentation, skin pores, skin hydration, skin sebum level, acne, moles, skin radiance, skin shine, skin dullness, and skin barrier, forecast of the cosmetic skin attribute in future, and mixtures thereof. Cosmetic skin attribute is more preferably selected from the group consisting of: Stressed Skin, Healthy Skin, Inflaming Skin, Hidden Aging Skin, skin age, skin topography, skin tone, skin pigmentation, skin hydration, skin sebum level, moles, skin radiance, skin shine, skin dullness, and skin barrier, forecast of the cosmetic skin attribute in future, and mixtures thereof. Cosmetic skin attribute is still more preferably selected from the group consisting of: Stressed Skin, Healthy Skin, Inflaming Skin, Hidden Aging Skin, and mixtures thereof.

"Tile" as used herein includes a unit, such as for example a pixel, which form a part of a digital image and accordingly "Tiles" form the whole of the digital image.

"Digital image data" as used herein includes image data obtained from an image obtaining device including but not limited to a digital camera, a photo scanner, a computer readable storage medium capable of storing digital images, and any electronic device including picture taking capabilities. Digital image data may also include color channel images which are converted from a RGB image into a color channel image in a color system.

"Single degree of indicium" as used herein includes all electronic visual representations including but not limited to a graphical symbol, a numerical value, a color code, illumination techniques and combinations thereof.

"L*a*b*" as used herein, refers to the commonly recognized color space specified by the International Commission on Illumination ("CIE"). The three coordinates represent (i) the lightness of the color (i.e., L*=0 yields black and L*=100 indicates diffuse white), (ii) the position of the color between magenta and green (i.e., negative a*values indicate green while positive a*values indicate magenta) and (iii) the position of the color between yellow and blue (i.e., negative b* values indicate blue and positive b* values indicate yellow).

"Skin age" as used herein, means apparent age which refers to the age of skin of a person that is visually estimated or perceived to be, compared to norm age skin appearances, based on the physical appearances, preferably a face of the person, preferably at least a portion of a face of the person, more preferably, at least one region of interest (ROI) of the at least a portion of a face of the person, even more preferably, the at least one ROI is selected from the group consisting of: a skin region around the eye ("eye region"), a skin region around the cheek ("cheek region"), a skin region around the mouth ("mouth region"), and combinations thereof, still more preferably a skin region around the cheek ("cheek region").

"Skin tone" as used herein, generally refers to the overall appearance of basal skin color or color evenness. Skin tone is typically characterized over a larger area of the skin. The area may be more than 100 $mm^2$, but larger areas are envisioned such as the entirety of the facial skin or other bodily skin surfaces (e.g., arms, legs, back, hands, neck).

"Skin wrinkle" as used herein, generally refers to a fold, ridge or crease in the skin and includes but is not limited to fine lines, super fine lines, fine wrinkles, super fine wrinkles, wrinkles, lines. Skin wrinkle may be measured in terms of, for example, density and/or length.

"Skin radiance" as used herein, generally refers to an amount of light that the skin reflects, and may be referred to as skin shine.

"Skin texture" as used herein, generally refers to the topography or roughness of the skin surface.

"Skin tension" as used herein, generally refers to the firmness or elasticity of the skin.

"Skin sebum level" as used herein, generally refers to an amount of sebum which is an oily or waxy matter secreted by ssebaceous glands in the skin.

"Skin spots" as used herein, generally refers discoloration or uneven pigmentation (e.g., hyperpigmentation, blotchiness) of the skin. Skin spots may be evaluated in terms of, e.g., density, size, and/or degree of discoloration.

"Skin care product" as used herein, refers to a product that includes a skin care active and regulates and/or improves skin condition.

"Digital image" as used herein, refers to a digital image formed by pixels in an imaging system including but not limited to standard RGB, or the like and under images obtained under different lighting conditions and/or modes. Non-limiting examples of a digital image include color images (RGB), monochrome images, video, multispectral image, hyperspectral image or the like. Non-limiting light conditions include white light, blue light, UV light, IR light, light in a specific wavelength, such as for example light source emitting lights from 100 to 1000 nm, from 300 to 700 nm, from 400 to 700 nm or different combinations of the upper and lower limits described above or combinations of any integer in the ranges listed above. The digital image may be obtained from an image obtaining device including but not limited to a digital camera, a photo scanner, a computer readable storage medium capable of storing digital images, and any electronic device including picture taking capabilities.

In the following description, the system, method, and apparatus described is a system, method, and apparatus for determining a cosmetic skin attribute based on a disorder value of a certain color of a person's skin.

In an exemplary embodiment, the system is a stand-alone imaging system (shown in FIG. 2) that is located at a retail cosmetics counter for the purpose of analyzing and/or recommending cosmetic and skin care products, based on the determined cosmetic skin attribute based on a disorder value. However, it is contemplated that the system and the method may be configured for use anywhere, such as for example as shown in FIG. 1, through an electronic portable device comprising an image obtaining unit/device and a display, wherein the electronic portable device is connected to an apparatus for generating for display on a display, a graphical user interface for visualizing the cosmetic skin attribute through a network.

System

FIG. 1 is a schematic diagram illustrating a system 10 for determining a cosmetic skin attribute based on a disorder value and for optionally visualizing the disorder value and/or cosmetic skin attribute. The system 10 may include a network 100, which may be embodied as a wide area network (such as a mobile telephone network, a public switched telephone network, a satellite network, the internet, etc.), a local area network (such as wireless-fidelity, Wi-Max, ZigBee™, Bluetooth™, etc.), and/or other forms of networking capabilities. Coupled to the network 100 are a portable electronic device 12, and an apparatus 14 for generating for display on a display, a graphical user interface for visualizing a cosmetic skin attribute. The apparatus 14 is remotely located and connected to the portable electronic device through the network 100.

The portable electronic device 12 may be a mobile telephone, a tablet, a laptop, a personal digital assistant and/or other computing device configured for capturing, storing, and/or transferring a digital image such as a digital photograph. Accordingly, the portable electronic device 12 may include an input device 12*a* for receiving a user input, an image obtaining device 18 such as a digital camera for obtaining images and an output device 12*b* for displaying the images. The portable electronic device 12 may also be configured for communicating with other computing devices via the network 100. The portable electronic device 12 may further comprise an image processing device (not shown) coupled with said imaging obtaining device 18 for analyzing the obtained at least one color image to obtain a disorder value and determining the cosmetic skin attribute of the at least one portion of skin of the person based on the disorder value. The image processing device preferably comprises a processor with computer-executable instructions. The portable electronic device 12 may further comprise a display generating unit (not shown, such as an electronic LED/LCD display) for generating a display to display content data describing the determined cosmetic skin attribute.

The apparatus 14 may include a non-transitory computer readable storage medium 14*a* (hereinafter "storage medium"), which stores image obtaining logic 144*a*, image analysis logic 144*a* and graphical user interface (hereinafter "GUI") logic 144*c*. The storage medium 14*a* may comprise random access memory (such as SRAM, DRAM, etc.), read only memory (ROM), registers, and/or other forms of computing storage hardware. The image obtaining logic 144*a*, image analysis logic 144*b* and the GUI logic 144*c* define computer executable instructions. A processor 14*b* is coupled to the storage medium 14*a*, wherein the processor 14*b* is configured to, based on the computer executable instructions, for implementing a method 90 for determining a cosmetic skin attribute as described herein after with respect to the flowchart of FIG. 4.

Method

Figure 4:
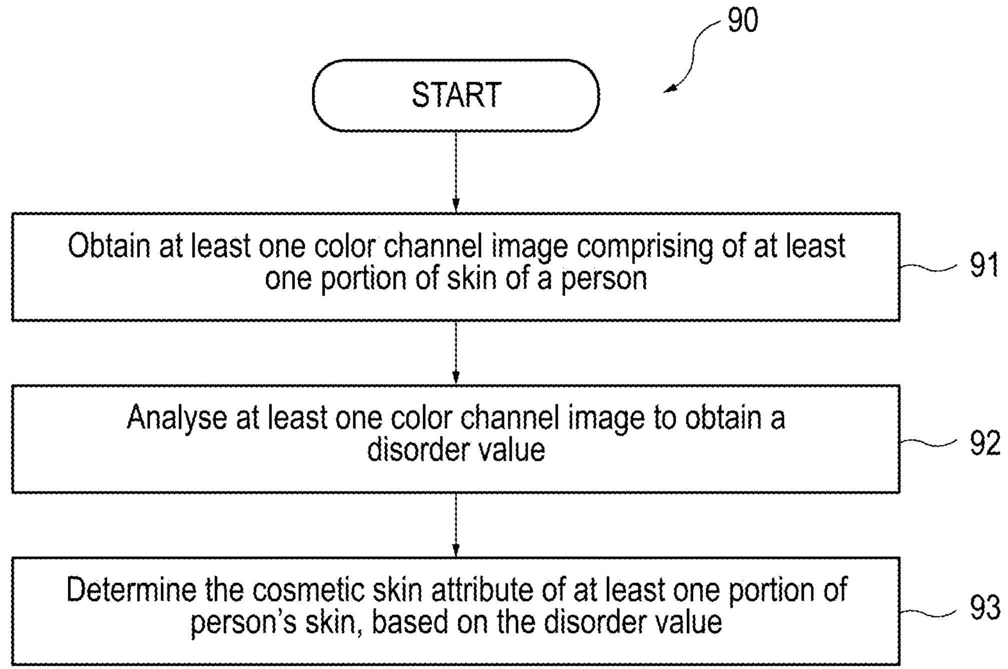
FIG. 4 is a flow chart illustrating a method for determining a cosmetic skin attribute.

Referring to FIG. 4, when the processor is initiated, the processor causes at least one color image preferably at least one color channel image comprising at least one portion of skin of the person to be obtained in step 91, e.g., via conversion of a digital image into a color channel image in a color system which will be described hereinafter with reference to FIG. 5. The at least one color channel image is analyzed in step 92 to obtain a disorder value. In step 93, the cosmetic skin attribute of the at least one portion of skin of the person is determined based on the disorder value.

Preferably, the disorder value is based on a color gradient. Alternatively, and/or concurrently, the disorder value is preferably based on at least one of the followings: total lengths of the edges of the certain color; a ratio of the longest radius to the shortest radius, wherein both radii are measured from the same center of the certain color; discrepancy of a tile of the certain color; and mixtures thereof. More preferably the disorder value is based on at least one of the followings: total lengths of the edges of the certain color; a ratio of the longest radius to the shortest radius, wherein both radius are measured from the same center of the certain color, still more preferably the disorder value is based on a ratio of the longest radius to the shortest radius, wherein both radius are measured from the same center of the certain color.

At least one color channel image may be an image in a color system selected from the group consisting of L*a*b* color system, RGB color system, HSL/HSV color system, and CMYK color system.

Referring to FIG. 1, the network 100 may be used to acquire digital images from the portable electronic device 12 and transmitting the digital images to the apparatus 14 to be used in the method 200. An input device 12*a* may be coupled to or integral with the portable electronic device 12 for receiving a user input for initiating the processor 14*b*. The portable electronic device 12 may comprise an output device 12*b* for displaying the plurality of tiles, each having uniquely assigned single degree of indicium. The input device 12*a* may include but is not limited to a mouse, a touch screen display, or the like. The output device 12*b* may include but is not limited to a touch screen display, a non-touch screen display, a printer, a projector for projecting the facial image map 30 on a display surface such as for example a mirror as described hereinafter with respect to FIG. 2.

Figures 2, 3:
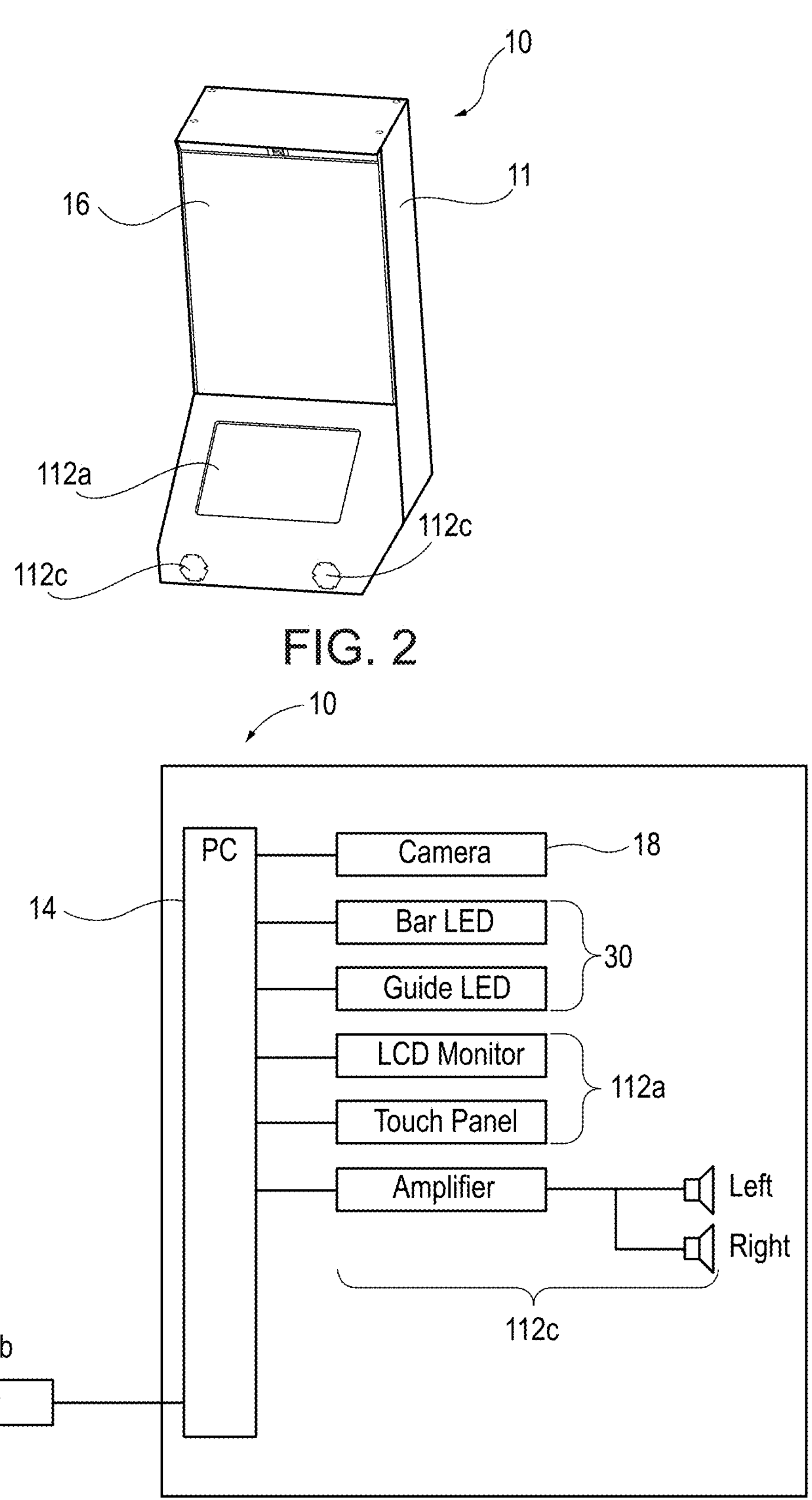
FIG. 2 is a diagram illustrating an alternative exemplary system for determining a cosmetic skin attribute, especially a perspective view of the system of FIG. 1, configured as an exemplary stand-alone imaging system.
FIG. 3 is a block diagram illustrating components of an exemplary system for determining a cosmetic skin attribute.

FIG. 2 is a perspective view of the system 10 configured as an exemplary stand-alone imaging system that is located at a retail cosmetics counter for the purpose of visualizing color gradient and/or at least one cosmetic skin attribute, and maybe also for the purpose of recommending cosmetic and skin care products based on the visualized color gradient and/or at least one cosmetic skin attribute. FIG. 3 is a block diagram of the exemplary system 10 of FIG. 2. Referring to FIGS. 2 and 3, the system 10 comprises a housing 11 for the apparatus 14 of FIG. 1 connected to an image obtaining device 18 for acquiring a digital image of a subject for visualizing at least one cosmetic skin attribute. Referring to FIG. 2, the system 10 may comprise a mirror 16, and the image obtaining device 18 may be mounted behind the mirror 16 within the housing 11 so that the image obtaining device 18 may be hidden from view. The image obtaining device 18 may be a digital camera, an analog camera connected to a digitizing circuit, a scanner, a video camera or the like. The system 10 may include lights 30 such as LED lights arranged about the housing 11 to form an LED lighting system for assisting in generating a digital image of a subject. The system 10 has an input device 112*a* for receiving a user input. The system 10 may further comprise an output device 112*b* such as a projector configured to receive and project the facial map 30 for display on the mirror 16. The projector is not shown in FIG. 2 as it may be a peripheral component that is separate from the housing 11 but coupled to the apparatus 14 to form the system 10. The system 10 may further comprise a second output device 112*c* such as one or more speakers optionally coupled to an amplifier for generating audio guidance output to complement and/or enhance an overall consumer experience.

To explain the way the system 10 and the method 90 work to determine and visualize at least one cosmetic skin attribute, it is helpful to understand the details of units/steps involved in the system and methods. Accordingly, the steps are described hereinafter as individual processes for performing each step. Each process may also be described as a sub-routine, i.e., a sequence of program instructions that performs a corresponding step according to the methods 90.

Obtaining Digital Image

Figures 7A, 7B, 7C, 8:
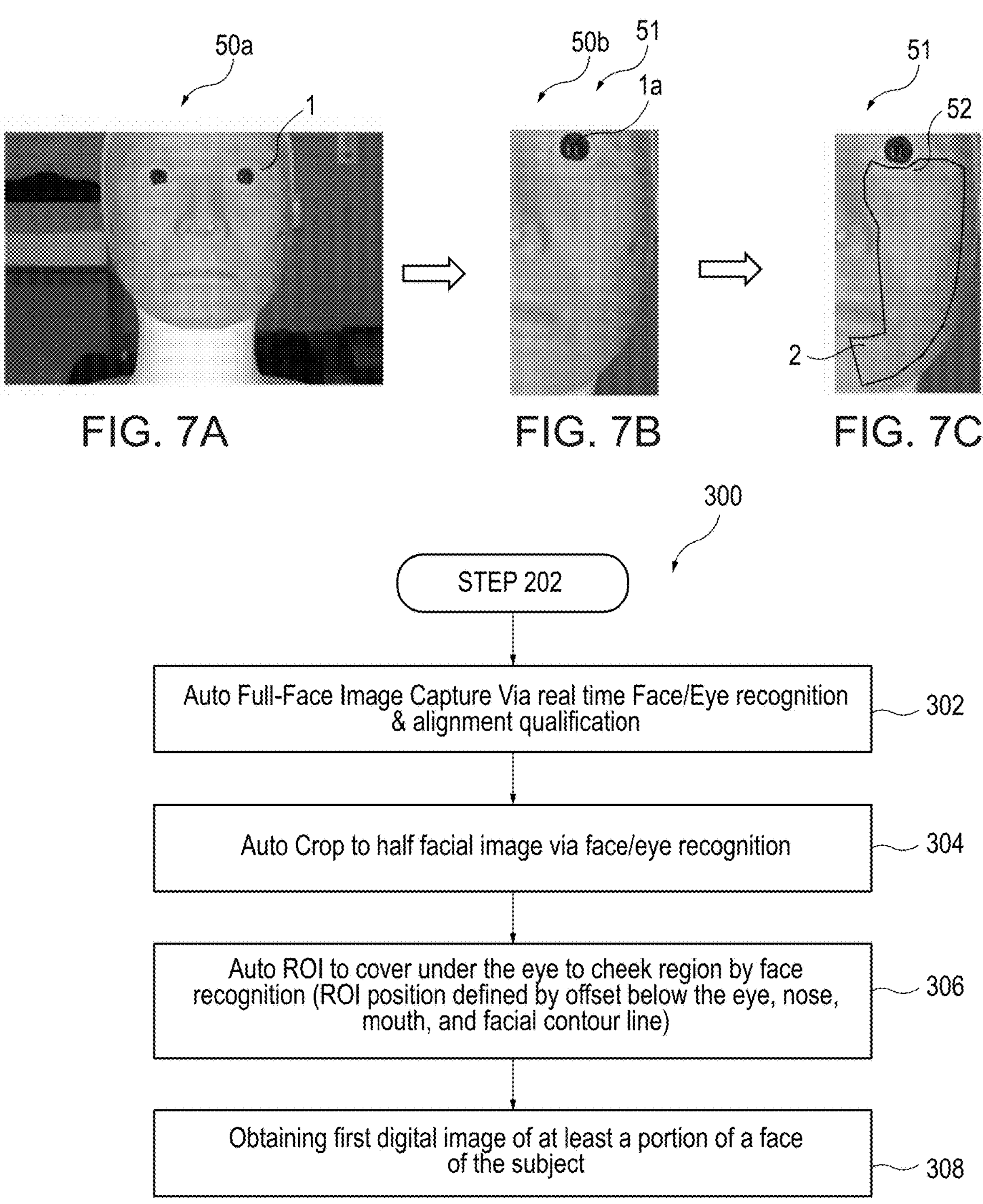
FIGS. 7A to 7C are a series of process flow diagrams exemplarily illustrating details of a step of obtaining a first digital image in a method of determining a cosmetic skin attribute.
FIG. 8 is a flow chart exemplarily illustrating the steps of obtaining the first digital image.

The step 202 of obtaining digital image according to the method 200 is described with reference to FIGS. 7A, 7B and 7C which is a series of process flow diagrams illustrating how digital image data is obtained from the digital image, and FIG. 8 is a flow chart of a process 400 of obtaining digital image data corresponding to the step 202.

An input image 50*a* of the face 1 is illustrated in FIG. 7A. The input image 50*a* may be captured by a user, for example, using the camera 18 in a step 402 of the process 400 as shown in FIG. 8. FIG. 7B illustrates a step 404 of cropping the input image 50*a* to obtain an edited image data 50*b* which comprises at least a portion of the face. The input image 50*a* may be cropped by identifying an anchor feature 1*a* of the face, including but not limited to facial features such as eyes, nose, nostrils, corners of the mouth or the like, and cropping accordingly. While the eye is depicted as the anchor feature 1*a* as shown in FIG. 7B, it will be appreciated that this is merely an example, and any prominent or detectable facial feature(s) may be an anchor feature. The edited image data 50*b* may be a first digital image 51 that is obtained in step 404. Alternatively, as shown in FIG. 7C, the edited image data 50*b* may be further processed by cropping to remove one or more unwanted portions of the input image 50*a* thereby obtaining the first digital image data 51 which includes the at least a portion of the face 1 defined by a boundary line 52 in step 408. Preferably, the first digital image is a cross polarized image. The obtained first digital image 51 may comprise at least one region of interest (ROI) 2 of the at least a portion of the face 1 that is defined by the boundary line 52. The ROI 2 may be the entire portion of the face 1, preferably at least a portion of the face, more preferably, one or more skin regions that defines the at least portion of the face 1. Details of how the skin regions are defined are described hereinafter with reference to FIG. 7, and the flowchart of FIG. 10.

Optionally, the process 400 may comprise step 406 in which the ROI 2 may be selected from a skin region around the cheek ("cheek region 2*b*"), preferably the ROI 2 is a part of the at least a portion of the face 1 of the subject, more preferably the obtained first digital image data define a left or right side of the face 1. The ROI 2 may comprise an area of at least 5%, from 10% to 100%, from 25% to 90% of the obtained first digital image.

Defining Tiles

Figure 9:
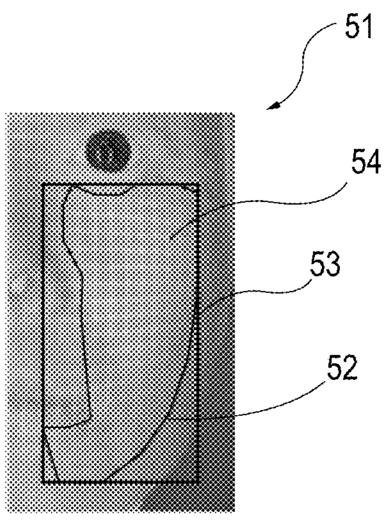
FIG. 9 is a picture exemplarily illustrating a step of defining a plurality of tiles in in a method of determining a cosmetic skin attribute.
Figure 10:
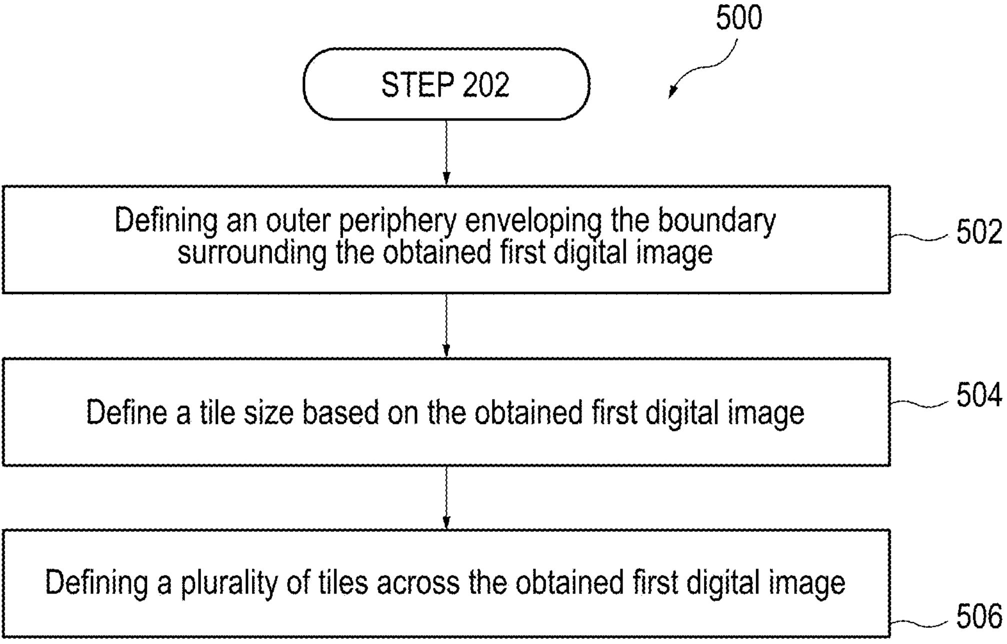
FIG. 10 is a flow chart exemplarily illustrating the steps of defining the plurality of tiles.

In some embodiment, the image data preferably ROI is divided into tiles with a defined tile size. FIG. 9 is a picture illustrating a plurality of tiles 54 on the first digital image data 51. FIG. 10 is a flow chart illustrating a process 500 of defining the plurality of tiles 54 on the first digital image data 51. Referring to FIG. 9, the first digital image 51 includes the at least a portion of the face 1 defined by a boundary line 52 as described hereinbefore with reference to FIG. 7C. Referring to FIG. 10, the process 500 comprises defining an outer periphery 53 enveloping the boundary line 52 surrounding the obtained first digital image (step 502). The obtained first digital image 51 is formed by a total number of pixels, for example, the obtained first digital image 51 may have a number of pixels which is determined at step 404 or step 406 depending on an image size after cropping of the input image 50*a*. Accordingly, an overall image size based on the obtained first digital image 51 may be defined in step 504. For example, if the tile size is set at 40 by 40 pixels to 70 by 70 pixels, accordingly, the number of tiles 54 that form the plurality of the tiles 54 across the obtained first digital image 51 in step 506 will be obtained by dividing the overall image size by the specified tile size. Alternatively, or concurrently, an area of one tile may form from about 1% to about 20% of the area of ROI, preferably from about 1% to about 10%, more preferably from about 1% to about 5%.

Obtaining Color Channel Image

The color channel image may be obtained from a digital image as described hereinafter with reference to FIG. 5.

Figure 5:
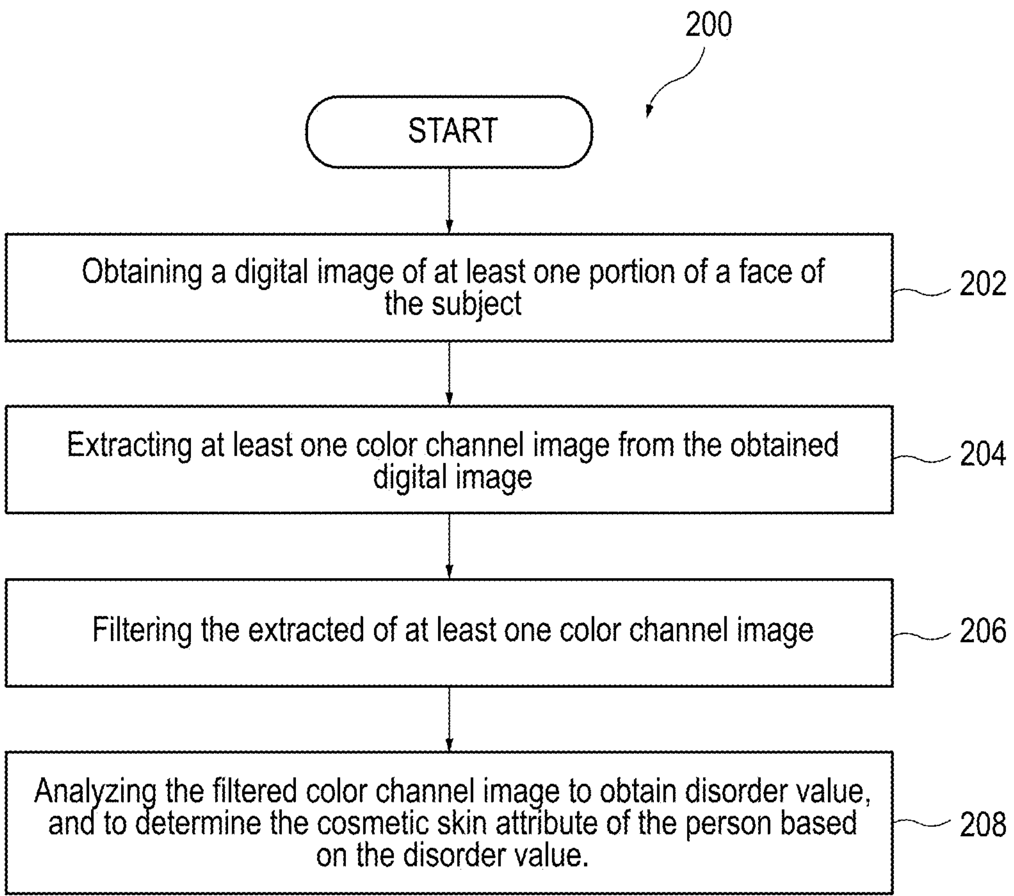
FIG. 5 is a flow chart illustrating an exemplary method for determining a cosmetic skin attribute.

Referring to FIG. 5, when the processor 14*b* is initiated, the processor 14*b* causes a digital image 51 of at least a portion of a face of the subject to be obtained, e.g., via image obtaining logic in step 202. The obtained digital image 51 may be a RGB cross polarized digital image or a RGB shine digital image. The digital image 51 in RGB system is converted from an RGB image to a digital image data, such as a color channel image in a different color system. The processor 14*b* further causes at least one color channel image to be extracted, e.g., via image analysis logic 144*b*, from the obtained digital image 51 in step 204. The at least one color channel image may be selected from any one of color channels in a color system. In step 206, the extracted at least one color channel image is filtered using a frequency filter. The filtered at least one color channel image is analyzed to obtain disorder value in step 208 to determine the cosmetic skin attribute of the person. Use of a frequency filter in step 206 removes noise from the extracted at least one color channel image, which increases sensitivity of the analysis in step 208, thereby resulting in higher accuracy in an analysis output from step 208 relative to analysing a non-filtered color channel image. However, analysing a non-filtered color channel image may be advantageous to reduce usage in computing hardware, such as reducing hardware footprint, data storage space or processing capability in the event that only very minimal and basic hardware is available for implementing the methods described herein.

Analyzing the image data may comprise analyzing at least two color channels in particular, the red color channel, the yellow color channel.

The method 200 may further comprise a step of comparing at least one cosmetic attribute to a pre-defined dataset to assign an index. The index may be displayed in a further step after the step of comparing.

Analyzing Image Data

FIG. 5 is a flow chart illustrating a process 200 of analyzing the image data. The process 200 may contain a step 204 for extracting at least one color channel from the obtained first digital image to provide an extracted color channel image for analysis to obtain disorder value to determine a cosmetic skin attribute based on the disorder value.

In the following description, the at least one color channel image is an image in the L*a*b* color system selected from the group consisting of a L color channel image, an a-channel image, a b-channel image, and combinations thereof, preferably an a-channel image, a b-channel image, and mixtures thereof, more preferably an a-channel image (red color). However, it will be appreciated that the at least one color channel may also be a chromophore system and the at least one color channel may be a melanin channel or a hemoglobin channel. The color system may also be a HSL/HSV color system, and CMYK color system.

The extracted color channel may be filtered, and the filtered color channel is analyzed for the disorder value, or the cosmetic skin attribute based on the disorder value. It will be appreciated that the filtered color channel may also be analyzed using other descriptive statistics including but not limited to, standard deviation, mean, or the like. A technical effect of using disorder value is that it has higher correlation with persons' skin color or skin conditions and/or persons' perceptions of their skin color or skin conditions.

Preferably, the disorder value is based on a color gradient. Alternatively and/or concurrently, the disorder value is preferably based on at least one of the followings: total lengths of the edges of the certain color; ratio of the longest radius to the shortest radius, wherein both radius are measured from the same center of the certain color; number of centers of the certain color; length of a radius from one center of the certain color; discrepancy of a tile of the certain color; and mixtures thereof, more preferably based on total lengths of the edges of the certain color. FIG. 6 shows each of the above preferred disorder values obtained for three different skin samples, compared to a conventional color analysis (a* mean) as a comparative example.

Preferably, the first digital image, more specifically, color channel image is filtered by using Smoothing filter, preferably Gaussian filters and/or frequency filters, more preferably Difference of Gaussian (DoG) filter among the frequency filters, helps to eliminate noises caused in image taking process. Especially frequency filter help to evaluate spatial pattern of color and topographic features separately. Optionally, the method 200 may further comprise applying an image correction factor to the filtered color channel prior to analyzing the filtered color channel.

In step 208, the cosmetic skin attribute of the at least one portion of skin of the person is determined based on the disorder value.

Preferably, the disorder value is obtained based on a color gradient, according to the following steps:

1) Select a region of interest (ROI) on the at least one color channel image;
2) Defining a plurality of tiles across the ROI;
3) Calculate an average intensity value of the certain color for each tile;
4) Calculate a gradient of the average intensity value between adjacent tiles by the following equation:

$$|I_{i,j} - I_{i+1,j}| + |I_{i,j} - I_{i,j+i}|$$

wherein $I_{ij}$ is an average intensity value of a tile at a position (i, j) calculated in the above step (3), $I_{i+1,\,j}$ is an average intensity value of a tile at a position (i+1, j) calculated in the above step (3), $I_{i,\,j+1}$ is an average intensity value of a tile at a position (i, j+1) calculated in the above step (3);

Therefore $|I_{i,j}-I_{i+1,\,j}|$ may means a gradient along x axis, and $|I_{i,j}-I_{i,j+1}|$ may mean a gradient along y axis. Preferably this step (4) is conducted for all tiles within ROI.

5) Calculate a disorder value by the following equation:

$$\left(\sum_i |I_{i,j} - I_{i+1,j}| + \sum_j |I_{i,j} - I_{i,j+1}|\right)/S_{ROI}$$

Wherein $S_{ROI}$ is total number of tiles within ROI.

Table 1 below sets out disorder value based on each color gradient with a corresponding color channel image and preferred corresponding cosmetic skin attributes to be determined based on the disorder value based on each color gradient. The color channel image described in Table 1 is an image in the L*a*b* color system selected from the group consisting of a L channel image, an a-channel image, a b-channel image, and combinations thereof.

TABLE 1

| Color Channel Image | Disorder Value | Preferred Cosmetic Skin Attribute to be determined |
|---|---|---|
| a-channel image | Based on a-gradient | "Stressed Skin, Healthy Skin, Inflaming Skin, Hidden Aging Skin," |
| b-channel image | Based on b-gradient | skin pigmentation, skin dullness |
| L channel image | Based on L-gradient | skin tone, skin dullness, skin pores |

Preferably, Color Channel Image is a-channel image, Disorder Value is based on a-gradient, and Preferred Cosmetic Skin Attribute to be determined is selected from the group consisting of Stressed Skin, Healthy Skin, Inflaming Skin, Hidden Aging Skin.

It has been found by the present inventors that a-gradient also indicate blood vessel status, for example: lower a-gradient indicates normal blood vessel status; medium a-gradient indicate having more vascular dilation (temporal) which is a signal of temporal inflammation; and higher a-gradient indicates having more vascular dilation (temporal) and vascular development (chronic) which is a signal of chronic inflammation.

Preferably, the cosmetic skin attribute is generated as a value indicative of a condition of the cosmetic skin attribute of the at least one portion of skin of the person relative to a defined population of people.

Specifically, in a visual perception study, consumers may be asked to rank digital images (e.g., photographs) of the defined population of people for a cosmetic skin attribute based on a predetermined scale. The ranked digital images may be stored as a database so as to be analyzed.

Also preferably, the cosmetic skin attribute is generated as a function of disorder value of at least one color channel image defined by F (Disorder Value), wherein said function is determined by a model established upon a training dataset wherein the training dataset comprises: (i) a plurality of color channel images of the defined population of people, wherein each of the plurality of color channel images comprises facial skin of a person in the defined population of people; (ii) an associated class definition based on the cosmetic skin attribute. More preferably, the cosmetic skin attribute is generated as a function of the disorder value in combination with basal skin color at the tile defined by F (Disorder Value, Basal Skin Color).

Preferably, the age of the subject and the average age of the defined population of people may be each independently from 18 to 60 years, preferably from 20 to 40 years, more preferably 25 to 35 years, even more preferably 28 to 32 years.

Techniques for building training datasets are known to a person skilled in the field of image processing methods and will not be further described.

The model is a regression model or a classification model; wherein said model is preferably a classification model, more preferably a machine learning classification model, most preferably a random forest classification model or Gradient Boosting classification model.

Using the machine learning model enables the advantages of accuracy, reproducibility, speed in the performance of the method when implemented as a native application on a portable electronic device. In particular, the weight of the model allows the native application to have a smaller hardware footprint, and consequently the methods may be easily deployed in portable electronic devices such as mobile phones with mobile phone operating systems (OS) including but not limited to iOS for the Apple™ phone or Android OS for Android phones.

The classification model may be used to classify consumers into a plurality of groups, each group having different degrees of a condition of the same cosmetic skin attribute, preferably two groups-so as to define an associated class definition based on the visual grading or any other numerical value of the cosmetic skin attribute. For example, the method may display a heat map configured to classify regions of the skin into a high level of a cosmetic skin attribute condition or a low level of a cosmetic skin attribute condition based on thresholds assigned to each of the groups.

Below is data generated based on correlation with results from a visual perception study using statistical analysis using Pearson correlation coefficient (r). The correlation results are shown below in Table 2 below.

TABLE 2

| | Pearson Correlation Coefficient (r) with results of Visual Perception Study | | | |
|---|---|---|---|---|
| Measures | Stressed Skin | Healthy Skin | Inflaming Skin | Hidden Aging Skin |
| Disorder value based on a-gradient | 0.79 | −0.83 | 0.73 | 0.75 |
| a* Mean | 0.0.54 | −0.60 | 0.52 | 0.52 |
| Spot | 0.43 | −0.51 | 0.34 | 0.62 |

A higher Pearson correlation coefficient (r) means that the gradient value is a factor that contributes more to the condition of the cosmetic skin attribute that is studied in the visual perception study. Specifically, the visual perception study is conducted based on a predetermined number of panelists=577, age of the panelists=20-50. The panelists are asked to grade each cosmetic attribute, such as Stress Skin, (as an example of the cosmetic skin attribute) on a scale of 1 to 6.

Based on the visual perception study results and above correlation results, it has been found that the disorder value of the filtered image (by frequency filter) has the higher correlation with the above cosmetic skin attributes. Therefore, use of the disorder value to determine cosmetic skin attribute of at least a portion of skin of a person in a digital image can be used to transform cosmetic skin attribute from a visually imperceivable cosmetic skin attribute into an explainable cosmetic skin attribute in a consumer relevant way to consumers.

Displaying

Figures 13A, 13B, 14:
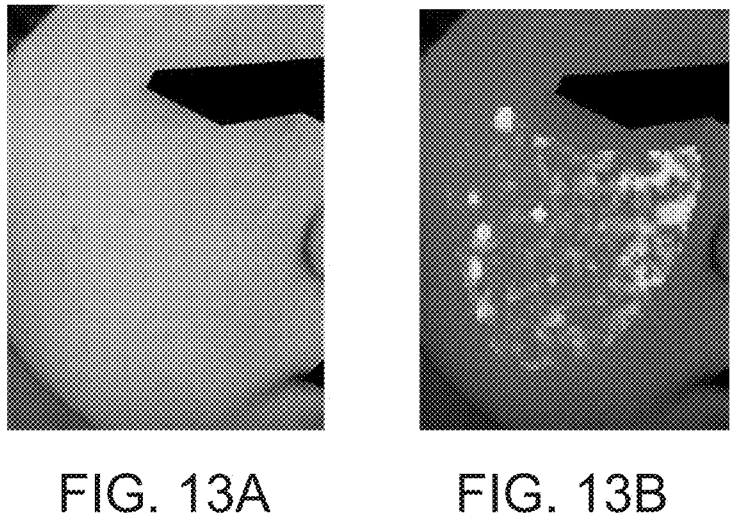
FIG. 13A is a picture exemplarily illustrating a first digital image and FIG. 13B is a picture exemplarily illustrating displaying the plurality of tiles, especially exemplarily illustrating second digital images interposed on the first digital image.
FIG. 14 is a flow chart illustrating an exemplary method of visualizing at least one cosmetic skin attribute.

The methods may further comprise a step of displaying the disorder value and/or cosmetic skin attribute based on the disorder value. The methods may further comprise a step of generating an image description corresponding to the generated disorder value described hereinbefore for visualizing a cosmetic skin condition. The image description may comprise a heat map (such as shown in FIG. 13B), an aggregate score (such as feature 934 in FIG. 15), and combinations thereof. The aggregate score may be computed based on the generated disorder value described hereinbefore.

Figure 11:
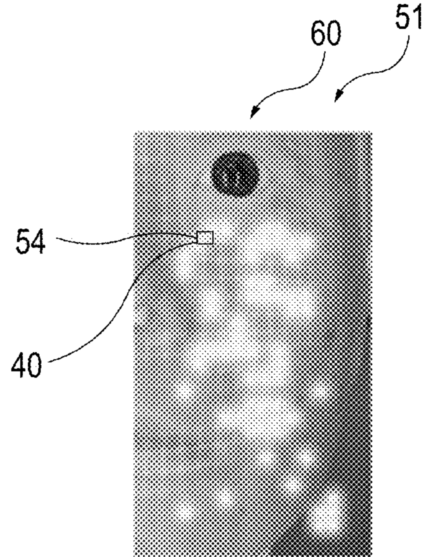
FIG. 11 is a picture exemplarily illustrating displaying the plurality of tiles, especially exemplarily illustrating a second digital image interposed on the first digital image.

FIG. 11 is a picture illustrating a second digital image 60 interposed on the first digital image data 51. The second digital image 60 includes at least a portion of the face of the subject with displayed plurality of tiles 54 each having uniquely assigned single degree of indicium 40.

Figure 12:
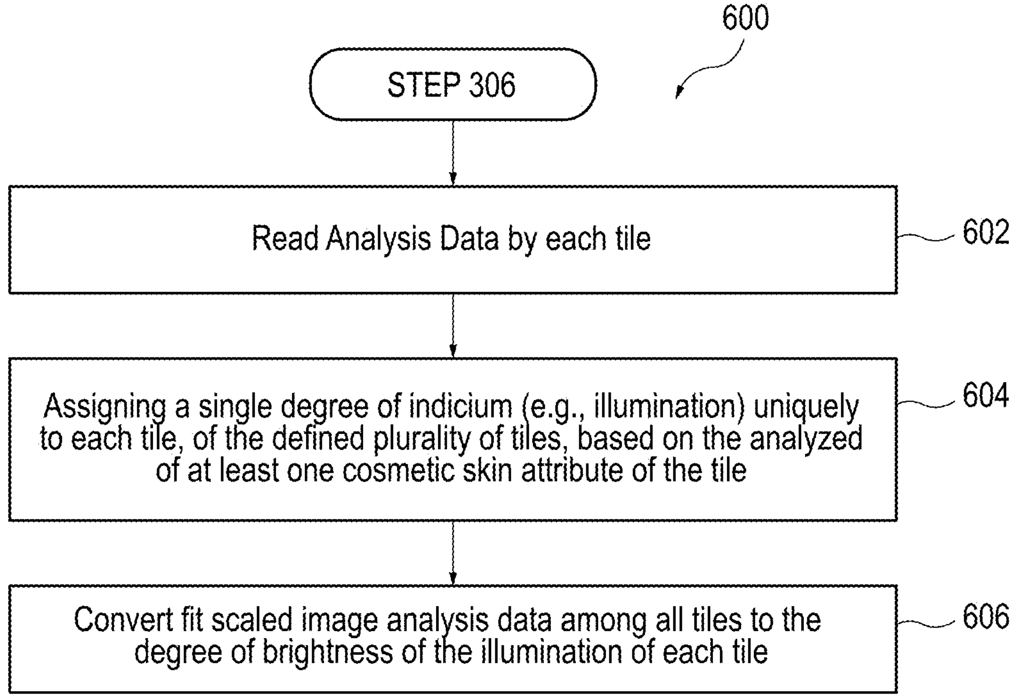
FIG. 12 is a flow chart illustrating an exemplary process of displaying the plurality of tiles.

FIG. 12 is a flow chart illustrating a process 600 of displaying the plurality of tiles in step 306 of the method 300. The process 600 may begin in step 602 in which the processor reads analyzed image data of each tile 54 and assigns a single degree of indicum uniquely to each tile 54 of the plurality of tiles based on the analyzed at least one visually cosmetic skin attribute of the tile 54 (step 604). When the single degree of indicium is illumination, the analyzed image data of each of the tiles may be converted to reflect a corresponding degree of brightness of the illumination at each tile in step 606. In an exemplary example, the tiles having higher degree of illumination has higher disorder value using color gradient value yet worser condition in at least one of the cosmetic skin attributes, relative to the tiles having lower degree of illumination yet better condition in at least one of the cosmetic skin attributes. Specifically, the method 300 may further comprise displaying at least one product recommendation item to treat the displayed cosmetic skin attribute.

FIG. 14 is a flow chart illustrating a method 700 of visualizing at least one cosmetic skin attribute. FIG. 13A is a color picture illustrating a first digital image of at least a portion of a face of a subject that is displayed in step 702 of the method 700 of FIG. 14. FIG. 13B is a color picture illustrating a second digital image of at least a portion of a face of a subject and a plurality of tiles each having uniquely assigned single degree of indicium, wherein the second digital image is interposed on the first digital image in step 704. FIG. 13B is an example of visualization of cosmetic skin attribute based on disorder value using color gradient, especially Inflaming skin and/or Hidden Aging skin which can be also a prediction of skin pigmentation such as location of Spots/melanin localization. In FIG. 13B, whiter tiles correspond to worser skin conditions, and darker tiles correspond to better skin condition. This visualization of cosmetic skin attribute can provide improved match to the persons' skin color or skin conditions and/or improved match to the persons' perceptions of their skin color or skin conditions, compared to other visualization such as a* mean and spot.

Human Machine User Interface

The method may include a human machine user interface (hereinafter "user interface") for providing a product recommendation to treat at least one cosmetic skin attribute. The user interface may be a graphical user interface on a portable electronic apparatus including a touch screen display/display with an input device and an image obtaining device. The user interface may comprise a first area of the touch screen display displaying a first digital image of at least a portion of a face of the subject obtained from the image obtaining device and a second digital image interposed on the first digital image, the second digital image having the at least a portion of a face of the subject and said displayed plurality of tiles each having uniquely assigned single degree of indicium. The user interface may further comprise a second area of the touch screen display different from the first area, the second area displaying a selectable icon for receiving a user input, wherein an image of at least one product recommendation item to treat the displayed cosmetic skin attribute is displayed on the touch screen display if the user activates the selectable icon.

Figure 15:
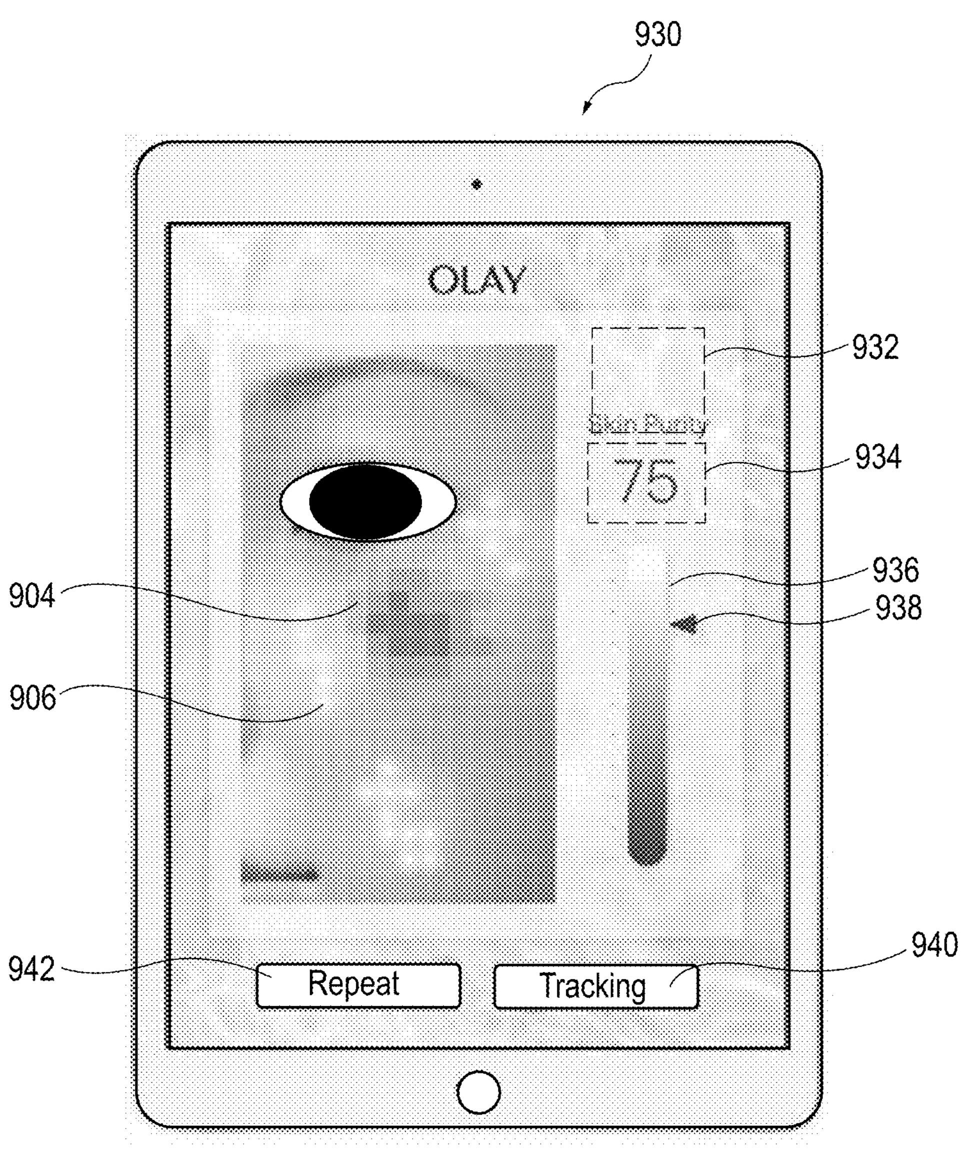
FIG. 15 is a screen shot illustrating an exemplary user interface for visualizing at least one cosmetic skin attribute.

FIG. 15 is a screen shot illustrating an exemplary user interface 930 for visualizing at least one cosmetic skin attribute, wherein the at least one cosmetic skin attribute is "Hidden Aging". The user interface 930 comprises alternate text 932 describing the cosmetic skin attribute and an aggregate score 934 based on disorder value. The user interface 930 may further comprise a meter 936 and a meter marker 938 for representing the aggregate score on a scale of 0 to 100 along the meter 936. The meter 936 is a different way of visualizing the aggregate score 934, and may be optional.

The methods for determining a cosmetic skin condition may further comprise a step of tracking the cosmetic skin attribute over a predetermined period of time, for example, by generating a calendar or schedule to create a cosmetic skin attribute diary to track improvement of cosmetic skin attributes. For example, when the consumer uses it on Day 1, the date and facial analysis is recorded and saved in the memory. Subsequently, whenever the consumer uses the method in future (after a predetermined period, 1 week, 1 month, 6 months), the facial skin of the consumer is analyzed again, and the consumer can compare how his/her facial skin looks at the time after the predetermined period relative to Day 1. The methods may be configured to be a downloadable software application that is stored as a native application on a portable electronic device or a web application that can be accessed through a login account specific to a consumer, so that the consumer can perform a self-skin analysis based on the methods and view and/or monitor the improvement (reduction in the ROIs with poorer cosmetic skin attribute condition) over a period of time.

The user interface 930 may further comprise a second selectable icon 942 which upon selection, enables the method for determining a cosmetic skin attribute to be repeated. For example, the method 90 described hereinbefore may be repeated.

Combinations

Representative embodiments of the present disclosure described above can be described as set out in the following paragraphs:

1. A method of determining a cosmetic skin attribute of a person, the method comprising the steps of:
   a) obtaining at least one color image comprising at least one portion of skin of the person;
   b) analyzing the at least one color image to obtain a disorder value of a certain color; and
   c) determining the cosmetic skin attribute of the at least one portion of skin of the person based on the disorder value.
2. The method of the preceding feature, wherein the disorder value is based on at least one of the followings:
   total lengths of the edges of the certain color;
   a ratio of the longest radius to the shortest radius, wherein both radii are measured from the same center of the certain color;
   discrepancy of a tile of the certain color;
   and mixtures thereof.
3. The method of any of the preceding features, wherein the disorder value is based on at least one of the followings:
   total lengths of the edges of the certain color;
   a ratio of the longest radius to the shortest radius, wherein both radii are measured from the same center of the certain color;
   and mixtures thereof.
4. The method of any of the preceding features, wherein the disorder value is based on a ratio of the longest radius to the shortest radius, wherein both radii are measured from the same center of the certain color.
5. The method of any of the preceding features, wherein the disorder value of the certain color is the disorder value of red color.

6. The method of any of the preceding features, wherein at least one color image is at least one color channel image.
7. The method of any of the preceding features, wherein the at least one color channel image is an image in a color system selected from the group consisting of L*a*b* color system, RGB color system, HSL/HSV color system, and CMYK color system.
8. The method of any of the preceding features, wherein the at least one color channel image is an image channel in L*a*b* color system.
9. The method of any of the preceding features, wherein the step (b) is conducted by the following steps:
   1) Select a region of interest (ROI) on the at least one color channel image;
   2) Defining a plurality of tiles across the ROI;
   3) Calculate an average intensity value of the certain color for each tile;
   4) Calculate a gradient of the average intensity value between adjacent tiles by the following equation:

$$|I_{i,j} - I_{i+1,j}| + |I_{i,j} - I_{i,j+i}|$$

wherein $I_{i,j}$ is an average intensity value of a tile at a position (i, j) calculated in the above step (3), $I_{i+1,\ j}$ is an average intensity value of a tile at a position (i+1, j) calculated in the above step (3), $I_{i,\ j+1}$ is an average intensity value of a tile at a position (i, j+1) calculated in the above step (3);
   5) Calculate a disorder value by the following equation:

$$\left(\sum_i |I_{i,j} - I_{i+1,j}| + \sum_j |I_{i,j} - I_{i,j+1}|\right)/S_{ROI}$$

Wherein $S_{ROI}$ is total number of tiles within ROI.
10. The method of any of the preceding features, wherein the step (4) is conducted for all tiles within ROI.
11. The method of any of the preceding features, wherein, prior to the step (b), the at least one color channel image is filtered by using: Smoothing filter and/or frequency filter.
12. The method of any of the preceding features, wherein the cosmetic skin attribute is selected from the group consisting of: skin age, skin topography, skin tone, skin pigmentation, skin pores, skin inflammation, skin hydration, skin sebum level, acne, moles, skin radiance, skin shine, skin dullness, and skin barrier, forecast of the cosmetic skin attribute in future, and mixtures thereof.
13. The method of any of the preceding features, wherein the cosmetic skin attribute is generated as a value indicative of a condition of the cosmetic skin attribute of the at least one portion of skin of the person relative to a defined population of people, and is generated as a function of disorder value of at least one image defined by F (Disorder Value), wherein said function is determined by a model established upon a training dataset wherein the training dataset comprises: (i) a plurality of images of the defined population of people, wherein each of the plurality of images comprises facial skin of a person in the defined population of people; (ii) an associated class definition based on the cosmetic skin attribute.

14. The method of any of the preceding features, wherein the cosmetic skin attribute is generated as a function of the disorder value in combination with basal skin color at the tile defined by F (Disorder Value, Basal Skin Color).
15. The method of any of the preceding features, wherein the model is a regression model or a classification model; wherein said model is preferably a classification model, more preferably a machine learning classification model, most preferably a machine learning random forest classification model or Gradient Boosting classification model.
16. The method any of the preceding features, wherein the at least one color channel image is a a-image; wherein the disordered value is a a-disordered value.
17. A system for determining a cosmetic skin attribute of a person, the apparatus comprising:
   an image obtaining unit for obtaining at least one image comprising at least one portion of skin of the person, wherein preferably said imaging obtaining device comprises a non-transitory computer readable storage medium configured to store the obtained at least one color image;
   an image processing unit coupled with said imaging obtaining unit for analyzing the obtained at least one image to obtain an disordered value and determining the cosmetic skin attribute of the at least one portion of skin of the person based on the disordered value,
   a display generating unit coupled with the image processing unit for generating a display to display content data describing the determined cosmetic skin attribute.
18. The system of the preceding feature 17, wherein said image processing device comprises a processor with computer-executable instructions.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of determining a cosmetic skin attribute of a person, the method comprising the steps of:

a) obtaining at least one color image comprising at least one portion of skin of the person, wherein the at least one color image is an a-channel image in the L*a*b* color system;

b) analyzing the at least one color a-channel image to obtain a disorder value of a certain color based on an a-gradient; wherein the disorder value is based on at least one of the following: total lengths of the edges of the certain color; a ratio of the longest radius to the shortest radius, wherein both radii are measured from the same center of the certain color; discrepancy of a tile of the certain color; or mixtures thereof;

c) determining the cosmetic skin attribute of the at least one portion of skin of the person based on the disorder value; wherein the cosmetic skin attribute is visually imperceivable and is selected from the group consisting of Stressed Skin, Hidden Aging Skin, and mixtures thereof.

2. The method of claim 1, wherein the disorder value is based on at least one of the following:

total lengths of the edges of the certain color;

a ratio of the longest radius to the shortest radius, wherein both radii are measured from the same center of the certain color;

and mixtures thereof.

3. The method of claim 2, wherein the disorder value is based on a ratio of the longest radius to the shortest radius, wherein both radii are measured from the same center of the certain color.

4. The method of claim 1, wherein the step (b) is conducted by the following steps:

1) Select a region of interest (ROI) on the at least one color channel image;

2) Defining a plurality of tiles across the ROI;

3) Calculate an average intensity value of the certain color for each tile;

4) Calculate a gradient of the average intensity value between adjacent tiles by the following equation:

$$|I_{i,j} - I_{i+1,j}| + |I_{i,j} - I_{i,j+i}|$$

wherein $I_{i,j}$ is an average intensity value of a tile at a position (i, j) calculated in the above step (3), $I_{i+1,\ j}$ is an average intensity value of a tile at a position (i+1, j) calculated in the above step (3), $I_{i,\ j+1}$ is an average intensity value of a tile at a position (i, j+1) calculated in the above step (3);

5) Calculate a disorder value by the following equation:

$$\left(\sum_i |I_{i,j} - I_{i+1,j}| + \sum_j |I_{i,j} - I_{i,j+1}|\right)/S_{ROI}$$

Wherein $S_{ROI}$ is total number of tiles within ROI.

5. The method of claim 4, wherein the step (4) is conducted for all tiles within ROI.

6. The method of claim 1, wherein, prior to the step (b), the at least one color a-channel image is filtered by using: Smoothing filter and/or frequency filter.

7. The method of claim 1, wherein the cosmetic skin attribute is generated as a value indicative of a condition of the cosmetic skin attribute of the at least one portion of skin of the person relative to a defined population of people, and is generated as a function of disorder value of at least one image defined by F(Disorder Value), wherein said function is determined by a model established upon a training dataset wherein the training dataset comprises: (i) a plurality of images of the defined population of people, wherein each of the plurality of images comprises facial skin of a person in the defined population of people; (ii) an associated class definition based on the cosmetic skin attribute.

8. The method of claim 1, wherein the cosmetic skin attribute is generated as a function of the disorder value in combination with basal skin color at the tile defined by F(Disorder Value, Basal Skin Color).

9. The method of claim 7, wherein the model is a regression model or a classification model.

10. A system for determining a cosmetic skin attribute of a person, the system comprising:

an image obtaining unit for obtaining at least one color image comprising at least one portion of skin of the person, wherein said imaging obtaining unit comprises a non-transitory computer readable storage medium configured to store the obtained at least one color image, and wherein the at least one color image is an a-channel image in the L*a*b* color system;

an image processing unit coupled with said image obtaining unit for analyzing the obtained at least one color a-channel image to obtain a disordered value of a certain color based on an a-gradient and determining the cosmetic skin attribute of the at least one portion of skin of the person based on the disordered value, wherein the disorder value is based on at least one of the following: total lengths of the edges of the certain color; a ratio of the longest radius to the shortest radius, wherein both radii are measured from the same center of the certain color; discrepancy of a tile of the certain color; or mixtures thereof, and wherein the cosmetic skin attribute is visually imperceivable and is selected from the group consisting of Stressed Skin, Hidden Aging Skin, and mixtures thereof; and a display generating unit coupled with the image processing unit for generating a display to display content data describing the determined cosmetic skin attribute.

11. The system of claim 10 wherein said image processing unit comprises a processor with computer-executable instructions.

* * * * *